US009637089B2

(12) United States Patent
Miller et al.

(10) Patent No.: US 9,637,089 B2
(45) Date of Patent: May 2, 2017

(54) WINDSHIELD WIPER SYSTEM

(71) Applicant: AIRBUS HELICOPTERS DEUTSCHLAND GMBH, Donauworth (DE)

(72) Inventors: Vitali Miller, Landsberg am Lech (DE); Roland Luik, Wilburgstetten (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 309 days.

(21) Appl. No.: 14/528,618

(22) Filed: Oct. 30, 2014

(65) Prior Publication Data

US 2015/0121642 A1    May 7, 2015

(30) Foreign Application Priority Data

Nov. 5, 2013    (EP) .................................... 13400026

(51) Int. Cl.
*B60S 1/34*    (2006.01)
*B60S 1/32*    (2006.01)
(Continued)

(52) U.S. Cl.
CPC ........... *B60S 1/3406* (2013.01); *B60S 1/3404* (2013.01); *B60S 1/3409* (2013.01); *B60S 1/3486* (2013.01);
(Continued)

(58) Field of Classification Search
CPC .... B60S 1/3402; B60S 1/3404; B60S 1/3406; B60S 1/3409; B60S 1/3486; B60S 1/3445; B60S 1/3425; B60S 1/42; B60S 1/44
(Continued)

(56) References Cited

U.S. PATENT DOCUMENTS 3,874,019 A    4/1975    Speth
4,553,283 A    11/1985    Speth
(Continued)

FOREIGN PATENT DOCUMENTS

EP    0296081    12/1988
EP    0351528    1/1990
(Continued)

OTHER PUBLICATIONS

Korean Notice of Preliminary Rejection Dated Jul. 18, 2016, Application No. 10-2014-0144522, Applicant Airbus Helicopters Deutschland GmbH, 4 Pages.
(Continued)

*Primary Examiner* — Gary Graham
(74) *Attorney, Agent, or Firm* — Brooks Kushman P.C.

(57) ABSTRACT

A windshield wiper system (3) for a windshield (1) having a curved surface and an oscillating gear drive (2) with a central park position (A). Said system (3) comprises at least one wiper arm (13) and wiper blades (5), said wiper blades (5) being mounted by means of said at least one wiper arm (13) to said oscillating gear drive (2). The windshield (1) and the wiper blade lips (11) have a frictional coefficient (μ). Two wiper arms (13), two wiper blades (5) each with a fit bolt (20), bearing bushes (10), a prolongation fitting (7) and a rocker (6) are provided. Said two wiper blades (5) are mounted rotatable about a wiper blade rotation axis (9), perpendicular to said oscillatory axis (V) and said longitudinal axis (U). Said wiper blade rotation axis (9) is defined by a center line through the fit bolts (20) mounted opposed to each other on said two wiper blades (5) being essentially parallel with a distance (a) to each other. Said rocker (6) rotatable attaches each of the two wiper blades (5) by means of the fit bolt (12). The prolongation fitting (7) rotatable (Continued)

attaches the rocker (6) to the wiper arms (13). The fit bolt (12) with the rocker (6) defines a rocker rotation axis (8) in a plane defined by said oscillatory axis (V) and said longitudinal axis (U) with an inclination angle β to the outer surface of the windshield (1) in the central park position (A) providing a distance (b) direct under the wiper blades rotation axis (9) between the windshield (1) and the rocker rotation axis (8) perpendicular to the windshield (1) in the central park position (A) fulfilling $$\left[\frac{2 \cdot b}{a}\right] < (1 - \mu).$$

9 Claims, 11 Drawing Sheets

(51) Int. Cl.
  *B60S 1/44* (2006.01)
  *B60S 1/42* (2006.01)
  *B60S 1/38* (2006.01)

(52) U.S. Cl.
  CPC . *B60S 1/42* (2013.01); *B60S 1/44* (2013.01); *B60S 1/3425* (2013.01); *B60S 2001/3837* (2013.01)

(58) Field of Classification Search
  USPC .......................... 15/250.21, 250.23, 250.41
  See application file for complete search history.

(56) References Cited

U.S. PATENT DOCUMENTS

| | | | |
|---|---|---|---|
| 4,958,405 | A | 9/1990 | Kuhbauch |
| 5,502,866 | A | 4/1996 | Battlogg |
| 6,272,717 | B1 | 8/2001 | Saraydar |
| 2002/0056168 | A1 | 5/2002 | Horii et al. |
| 2007/0186366 | A1 | 8/2007 | Alley |

FOREIGN PATENT DOCUMENTS

| | | |
|---|---|---|
| FR | 2490565 | 3/1982 |
| FR | 2746355 | 9/1997 |
| FR | 2757815 | 7/1998 |
| FR | 2878802 | 6/2006 |
| WO | 9205982 | 4/1992 |
| WO | 2005095170 | 10/2005 |

OTHER PUBLICATIONS

Extended European Search Report for EP 13400026A, Completed by the European Patent Office, Dated May 28, 2014, 4 Pages.

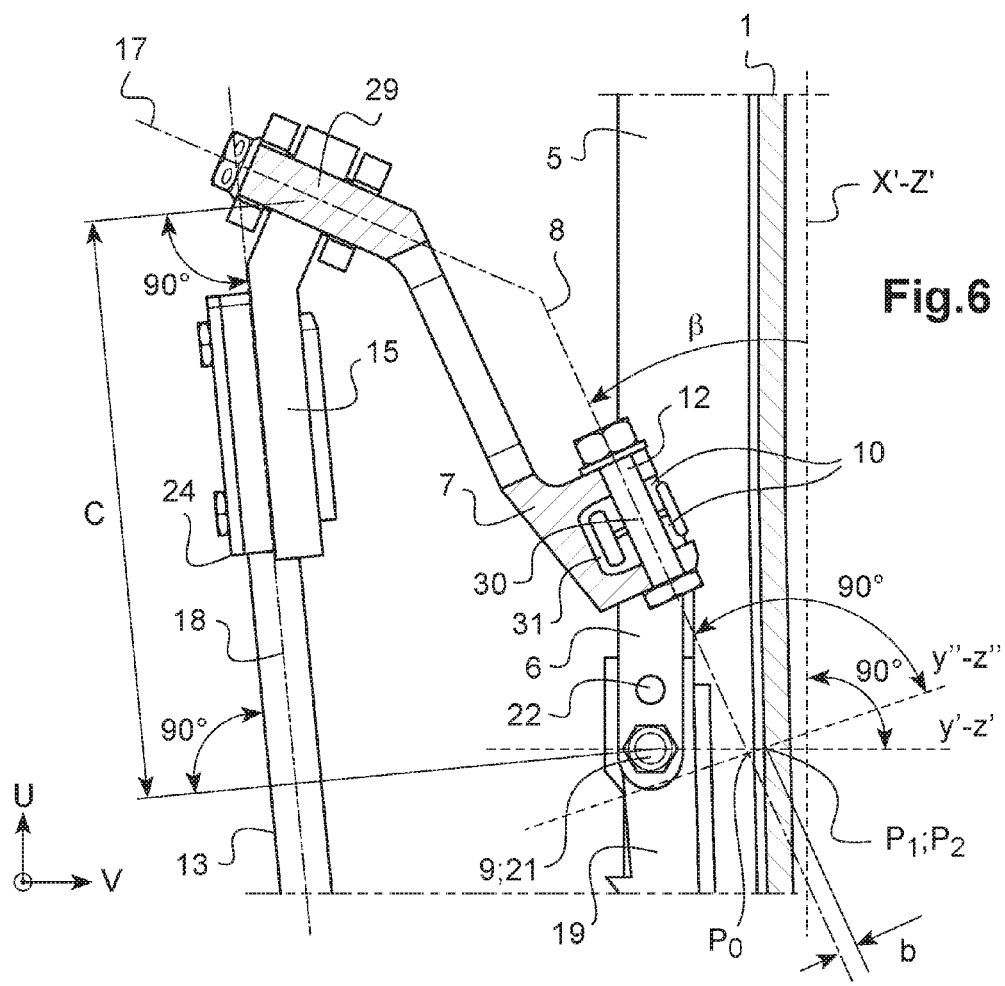
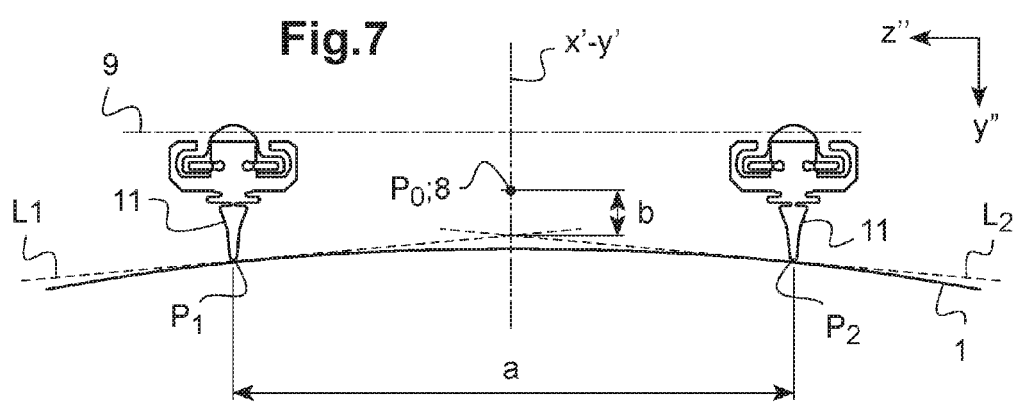

WINDSHIELD WIPER SYSTEM

CROSS REFERENCE TO RELATED APPLICATION

This application claims priority to European patent application No. EP 13 400026.4 filed on Nov. 5, 2013, the disclosure of which is incorporated in its entirety by reference herein.

BACKGROUND OF THE INVENTION (1) Field of the Invention

The invention relates to a twin blade windshield wiper system for strong curved windshield surfaces. The invention is particularly useful to strong curved windshields, such as in rotary wing aircrafts like rotary wing aircrafts.

(2) Description of Related Art

The cleaning performance of wiper blades depends on a lean angle $\alpha$ between a wiper blade axis, which is perpendicular to the longitudinal extension of the wiper blade through the contact point of a wiper blade lip, and a perpendicular line to the windshield surface. The lean angle $\alpha$ can be defined by $\alpha = \alpha_T - (\alpha_C \pm \epsilon)$. The angle $\alpha_T$ is the target lean angle, which describes the necessary angle of rotation of the wiper blade axis perpendicular to the windshield surface. The angle $\alpha_C$ is the wiper system configuration lean angle, which describes the angle of rotation of the wiper blade axis about the wiper blade longitudinal extension given by the control parts and/or piloting actuators of wiper system. The angle $\epsilon$ is the error tolerance lean angle, which comes for example from the low stiffness of the wiper system components or from other technical/physical aspects.

The best wiper cleaning performance of the wiper blade is provided when the wiper blade axis remains perpendicular to the windshield surface ($\alpha = 0$) while being driven between an end position (C) on a right side of the windshield, a central park position (A) and an end position (B) on the left side of the windshield, each of said positions (B) and (C) being angularly separated from the central park position (A) by an angle $\gamma$. Due to the strong curvature of modern windshields, particularly the windshields of rotary wing aircrafts, wipe cleaning performances are not continuous in all windshields areas. Especially towards outer left and right side positions of the wiper blade on the windshield, the angle $\alpha$ tends to deteriorate to higher angles $\alpha$ and therefore the cleaning performance of the wiper blade may become poor. Lean angles $\alpha$ higher than twenty degree leads to very poor cleaning performance and moreover the commonly metallic wiper blade frame touches the windshield and subsequently the bias of the lip of wiper blade against the windshield is restricted. A further consequence of the metallic wiper blade frame touching the windshield is that the frame may scratch the windshield during the wiper system operation and scratches in the windshield may deteriorate visibility for any crew behind the windshield.

The documents WO2005095170, FR2757815, FR2746355, U.S. Pat. No. 5,502,866 or WO9205982, US2002/0056168, EP0296081 and EP0351528 show wiper systems with control of the wiper blade lean angle $\alpha$. An additional control arm or other mechanic control parts and/or piloting actuators for orienting the wiper blade perpendicular to the vehicle windshield are disclosed. Different windshields with different degrees of curvature necessitate different special control parts and/or piloting actuators according to said prior art resulting in a high number of different special control parts and/or piloting actuators respectively for small series at relatively high costs.

Another disadvantage of this prior art is the possible unstable wiper system behavior. This instability results from the forces exerted on the wiper blade. A spring force ensures the contact between the wiper blade lip and the windshield. A drive force causes the radial motion of the wiper blade on the windshield. Other forces exerted on the wiper blade are the aerodynamic, frictional and reaction forces. Different forces generate two different kinds of moments on the pivot-mounted wiper blade, i.e. the stable and the instable moment. Stable behavior of the wiper system is ensured, when the stable moment is equal to or greater than the instable moment. If the behavior of the wiper system is not stable, the wiper blade tilts over the windshield and the cleaning performance of the wiper system decreases. Further cases of the system collapsing are caused by the blockage of the guide wheel, e. g. sand in wheel or snow on the windshield or by strong curved windshield.

The document US2002/0056168 proposes a wiper system, able to orient the wiper blade perpendicular to the windshield, where the control of a local lean angle along the wiper blade (by the twist of wiper blade) is the target of the system. The additional orientation control of the local angle along the blade is more expensive, heavier and more complex in realization.

The document U.S. Pat. No. 6,272,717 describes a windshield wiper system supporting a pair of wiper elements via a wiper drive arm pivotably mounted proximate a vehicle windshield. A drive arm attachment member is adapted to be coupled with the wiper drive arm. A pivot arm is pivotably secured to the drive arm attachment member about a pivot axis which intersects the windshield. The pivot arm carries the pair of wiper elements such that each of the wiper elements moves over a corresponding first arcuate path when the drive arm is rotated in a first direction. Each paths of a first wiper element is different from the paths of a second wiper element. The wiper elements can also move between a upper position in a first direction, and a lower position when rotated in the opposite direction. Alternatively, each of the wiper elements moves between a first angular position and a second angular position in the opposite direction.

The document FR2878802 describes a glass wiper has a squeegee rotating around a longitudinal axis following a determined movement when radius of curvature of a windshield varies. The squeegee rotates such that a wiping blade supports against the windshield while preserving an angle between average angle and 90 degrees relative to the windshield. A drive arm driving the squeegee exerts a force in a mediator plane located between a blade and the wiping blade.

The document FR2490565 describes a wiping device for cleaning windscreens of motor vehicles. A central plane of the wiping strip remains constantly perpendicular with respect to the wiping point on the windscreen. A drive arm is connected to a drive shaft and a wiping element is connected via a cylindrical joint to the drive arm. The wiping element has identically shaped guide element. The two central planes run parallel and stand perpendicularly on the windscreen to be cleaned.

The document U.S. Pat. No. 4,553,283 describes a two-bladed windshield wiper adapter which tilts the wiper blades in the sweep movement direction. The adapter is formed with a plug receiving portion loosely fitted to a cross plate having two plug members disposed perpendicular thereto for receiving the wiper blades. The adapter has the ability to pivot and tilt at the position where the plug receiving portion is coupled to the cross plate.

BRIEF SUMMARY OF THE INVENTION

It is an objective of the present invention to provide a twin blade windshield wiper for strong curved windshields, particularly for strong curved rotary wing aircrafts windshields, with an improved wipe performance along a wide operating range $2\gamma$.

The solution is provided with a twin blade windshields wiper, particularly for strong curved rotary wing aircrafts windshields, with the features of claim 1. Preferred embodiments of the invention are presented in the sub claims.

According to the invention a twin blade windshield wiper system for vehicles, particularly a twin blade windshield wiper system for rotary wing aircraft, comprises a curved windshield having a surface, at least one spring loaded wiper arm, each respectively attached to one drive bracket in driving engagement and biased against said surface of said windshield. Each of said drive brackets has a longitudinal extension and defines a longitudinal bracket axis (U) along its longitudinal extension.

An oscillating drive is mounted at said windshield. Said at least one spring loaded wiper arm is mounted at said oscillating drive for oscillation about an oscillatory axis (V) across the windshield. Said longitudinal axis (U) is perpendicular to said oscillatory axis (V) and said oscillation s along a transversal axis (W), perpendicular to said longitudinal axis (U) and said oscillatory axis (V). The windshield wiper system comprises two wiper blades mounted by means of said at least one wiper arm to said oscillating drive. Said two wiper blades are mounted respectively to said at least one wiper arm distal to said oscillatory axis. Said two wiper blades are respectively defining when in a central park position (A) a longitudinal blade axis (U) along said curved surface of the windshield. Each wiper blade is designed elastic in its longitudinal extension (U). Said at least one wiper arm is aligned in said central park position (A) with said longitudinal blade axis (U). Said two wiper blades are attached to each other with a distance (a) to a rocker by means of wiper blade connections with one free rotational degree, where each one of said wiper blades is able to rotate independently by 360° about a wiper blade rotation axis, which is tangential to the windshield surface along the transversal axis during wiper system operation. Said rotation of the wiper blades about their wiper blade rotation axis and their elastic design in its longitudinal extension allows the wiper blades to follow the windshield curvature along their longitudinal extension during wiper system oscillation.

The rocker is attached to a prolongation fitting by means of a rocker connection with one free rotational degree, where the rocker is able to rotate about a rocker rotation axis. The rotation of the rocker about the rocker rotation axis allows the orientation of the wiper blade rotation axis tangential to the windshield surface. Said rocker rotation axis has an inclination angle $\beta$ to said longitudinal blade axis (U) of the windshield providing a rocker axis distance (b) directly relative to the windshield, see description on page 9. For a given distance (a) between said two wiper blades said rocker axis distance (b) fulfills a kinematic wiper system stability criterion:

$$\left[\frac{2b}{a}\right] < [1-\mu],$$

where the rocker rotation axis is in a position between said two wiper blades preferably in a central position. The coefficient $\mu$ is a friction coefficient between the wiper blade lip and the windshield surface. This criterion allows stable wiper operating behavior without regard to the aerodynamic load on the system.

In case of a twin arm wiper system said rocker is mounted to two cranked fittings by means of a prolongation fitting whereby the prolongation fitting respectively rotates about the prolongation fitting rotation axes each with one free rotational degree. In case of using two wiper arms the rotation of the prolongation fitting about the prolongation fitting rotation axes ensures the pantograph function of the wiper system. In case of a single arm wiper system said rocker is mounted to the wiper arm by means of a fitting, whereby the prolongation fitting and cranked fitting is one part fixed to the wiper arm (the pantograph function is not given).

The inventive twin blade windshield wiper system allows—across the entire range of oscillation of the wiper blades—the orientation of the wiper blades rotation axis tangential to the windshield surface ($\alpha=0$) without use of additional actuators and/or control arms or other control mechanical parts. The orientation of the inventive twin blade windshield wiper system is tracked continuously fully automatically by the windshield itself and the forces exerted on the wiper blades. The wiper system has an inherent configuration lean angle $\alpha_C$, which is always equal to the target lean angle $\alpha_T$. The lean angle $\alpha$ is therefore reduced to the error tolerance lean angle $\epsilon$. The error tolerance angle $\epsilon$ is independent of the stiffness of the inventive wiper system components and depends on the camber of the windshield surface and the distance (a) between the two wiper blades.

The respective error tolerance angles $\epsilon$ for the left and right wiper blades are the angles between from one hand a straight line connecting the points of contact of the respective left and right wiper blade lip with the curved windshield and from the other hand the respective left and right local tangents at the points of contact of the respective wiper blade lip with the curved windshield. The error tolerance angle $\epsilon$ for curved windshields depends on the curvature of the curved windshields and the magnitude value of the distance (a) between two parallel wiper blades. The error tolerance angle $\epsilon$ converges to zero degree when the distance (a) converges to zero. For non-curved windshields the error tolerance angle $\epsilon$ is zero degree independent of the distance (a).

The wiper blade axis of the inventive twin blade windshield wiper system is continuously essentially perpendicular to the windshield surface independently from the windshield degree of curvature and the installation of the system on different windshields without significant changes and in all positions during which the wiper system is operating. The inventive twin blade windshield wiper system has a stable kinematic behavior across the entire range of oscillation of the wiper blades and is able to withstand the blockage elements on the windshields, e. g. snow, without collapse of the wiper system. The invention provides the further advantages of adaptive orientation of the wiper blades perpendicular to the windshield and allows installation of the wiper system without fundamental geometry changes on different windshields with different degrees of curvature, e. g. convex/concave. The inventive twin blade windshield wiper system allows reducing the length of distance (a) between the wiper blades and by then reducing the error tolerance lean angle $\epsilon$. The reduction of this distance (a) can lead to an unstable wiper system behavior. To counter this, the inventive wiper system allows reducing the distance (b) by means of the inclination angle $\beta$ and the position of the rocker rotation axis relative to the wiper blade rotation axis.

According to a preferred embodiment of the invention the prolongation fitting rotation axes are respectively inclined to the longitudinal extension of the wiper arms in the (U-V)

plane by an angle δ to allow the alignment of the cross beam nearly tangential to the windshield while the wiper system is moving along the transversal axis (W). If the prolongation fitting is fix mounted on one wiper arm no pantograph function as well as no alignment of the prolongation fitting tangential to the windshield while the wiper system is moving along the transversal axis (W) is given. The range of the said inclination angle δ of at least two cranked fittings is between 45° and 135°. If the inclination angles δ of the prolongation fitting rotation axes are equal to 90° and parallel to the oscillating axis (V) no alignment of the cross beam tangential to the windshield surface along the transversal axis (W) is caused. The angle δ range of at least two cranked fittings between 45° and 90° is suitable for concave windshields and the angle δ range of at least two cranked fittings between 90° and 135° is suitable for convex windshields.

According to a further preferred embodiment of the invention said rocker connection between the rocker and the prolongation fitting is 2-10 cm away from the windshield to avoid the collision of any mechanic parts of the wiper system with the windshield surface during wiper system operation.

According to a further preferred embodiment of the invention the inclination angle β of said rocker rotation axis is 0°≤β<45° or 135°<β≤180° to allow adaption of the form of the wiper operating area to different windshield geometries and for optimal kinematic stability of the wiper system along the whole range of oscillation operation.

According to a further preferred embodiment of the invention two opposed wiper blades are adjustable on said rocker for more adaptive flexibility of the wiper system to different windshields with different aerodynamic flow characteristics.

According to a further preferred embodiment of the invention the prolongation fitting is adjustable in direction of said longitudinal blade axis (U) on said at least one wiper arm by means of clamping pieces for more adaptive flexibility of the inventive wiper system to different windshields.

According to a further preferred embodiment of the invention a soft filler cap can be mounted on the wiper system for a stopper and/or a damping function for an improved dynamic wiper system behavior.

BRIEF DESCRIPTION OF THE SEVERAL VIEWS OF THE DRAWINGS

Preferred embodiments of the invention are described with reference to the following description and drawings.

FIG. 6 is a cross sectional view along the line A-A of FIG. 3, FIG. 7, shows a cross sectional view along the line C-C of the part of the twin blade windshield wiper system of FIG. 4.

DETAILED DESCRIPTION OF THE INVENTION

Figure 1:
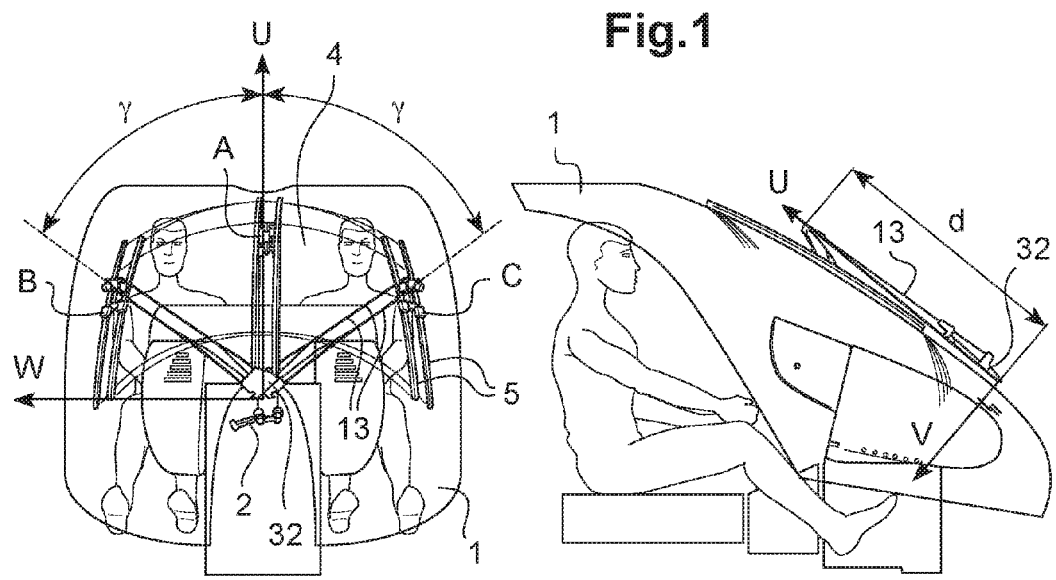
FIG. 1 shows an overall schematic frontal view and an overall schematic lateral view of a twin blade windshield wiper system for a curved windshield of a rotary wing aircraft.

According to FIG. 1 a pantograph twin blade windshield wiper system 3 is placed on a curved rotary wing aircraft windshield 1, with a minimal radius of the windshield curvature of 400 mm in three dimensions.

The twin blade windshield wiper system 3 has three particular positions within a wiper operation area 4: an end position (C) of the wiper system 3 on the right side of the windshield 1, a central park position (A) of the wiper system 3 on the windshield 1 and an end position (B) of the wiper system 3 on the left side of the windshield 1. Each of said end positions (B) and (C) is angularly separated in opposed directions from the central park position (A) by an angle γ.

An oscillating gear drive 2 of the twin blade windshield wiper system 3 is mounted on to the windshield 1 for driving at least one wiper arm 13 with attached wiper blades 5. The oscillating gear drive 2 is arranged to drive the at least one wiper arm 13 with the attached wiper blades 5 across the wiper operating area 4 angularly separating the right wiper system position (C) from the left wiper system position (B) with an angle 2γ. The magnitude value of the angle γ comes from the regulation and is the required magnitude of wiping; here the angle γ is equal to 42°.

The at least one driven wiper arm 13 of the twin blade windshield wiper system 3 is mounted on a drive bracket 32. In central park position (A) on the windshield 1 the longitudinal extension of the at least one drive bracket 32 defines a longitudinal axis (U) of a coordinate system inherent to the windshield 1. Said at least one wiper arm 13 is mounted respectively at said oscillating drive 2 for oscillation about an oscillatory axis (V) across the windshield 1. Said longitudinal axis (U) is perpendicular to said oscillatory axis (V). A transversal axis (W) of the coordinate system inherent to the windshield 1 is perpendicular to said oscillatory axis (V) and said longitudinal axis (U).

Figure 2:
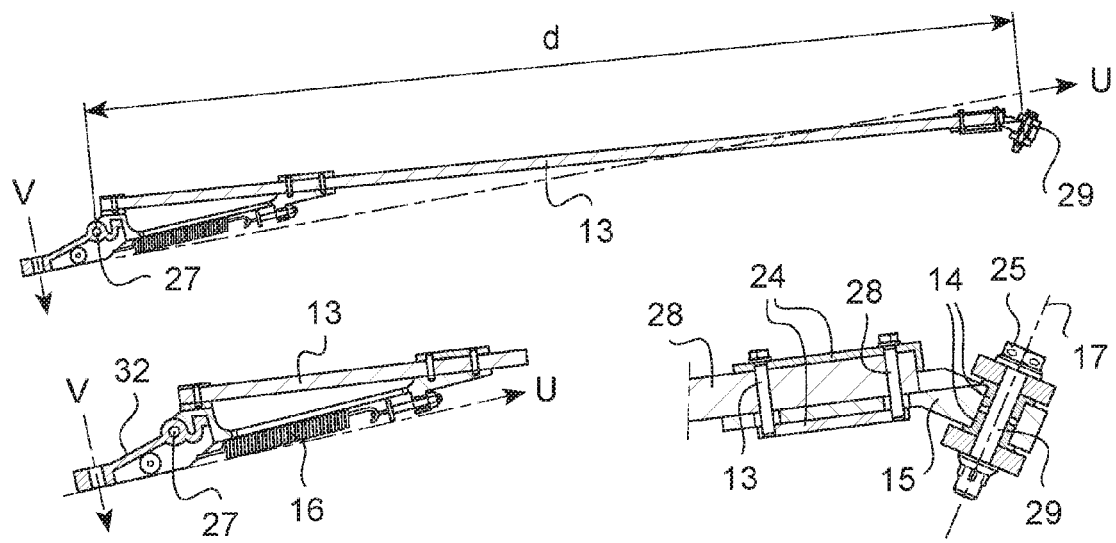
FIG. 2 shows a general and two partial detailed side views at enlarged scale of a wiper arm.

According to FIG. 2 corresponding features are referred to with the references of FIG. 1. A length d of said wiper arm 13 defines the distance between the center of a wiper arm rotation axis 27 and the center of a bore hole 29. Said bore hole 29 is located on a cranked fitting 15. The cranked fitting 15 is attached to the wiper arm 13 by a clamping piece 24 and bolts 28. Said wiper arm rotation axis 27 is perpendicular to the oscillatory axis (V) and allows translation of the cranked fitting 15 along the oscillatory axis (V) to follow the curvature of the windshield 1. A spring force exerted by a spring 16 biases the wiper blade 5 to the windshield 1.

The cranked fitting 15 is adjustable on its wiper arm 13 by means of the clamping pieces 24 and bolts 28 for more adaptive flexibility of the wiper system 3 to different windshields 1 for a variable length d of the wiper arm 13. The cranked fitting 15 is rotatable connected with bearing bushes 14 to a fit bolt 25. The bearing bushes 14 are integrated in the cranked fitting 15 for rotation about the fit bolt 25. The center line of the fit bolt 25 defines the prolongation fitting rotation axis 17.

Figure 3:
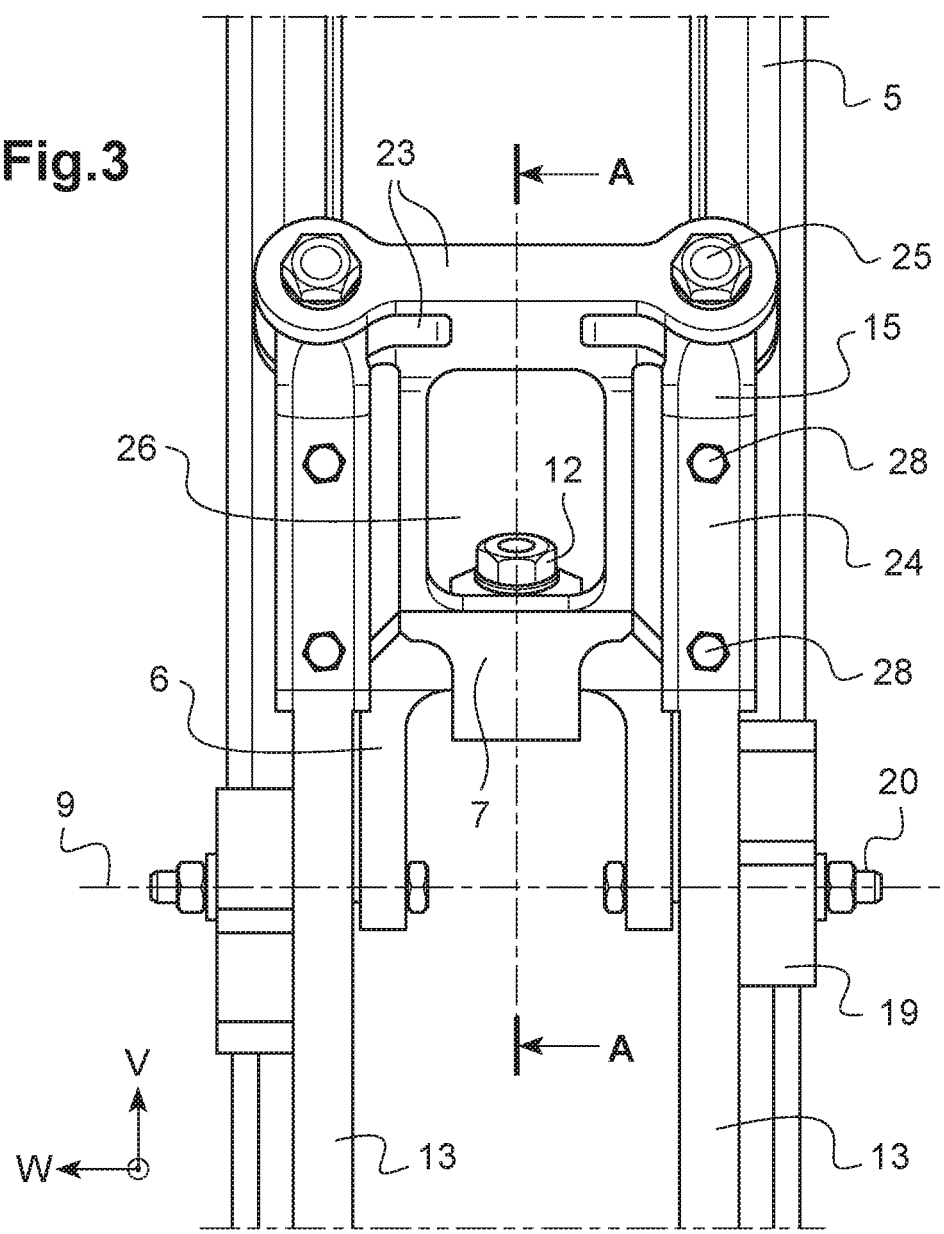
FIG. 3 shows a top view of a part of a twin blade windshield wiper system according to the invention.
Figure 4:
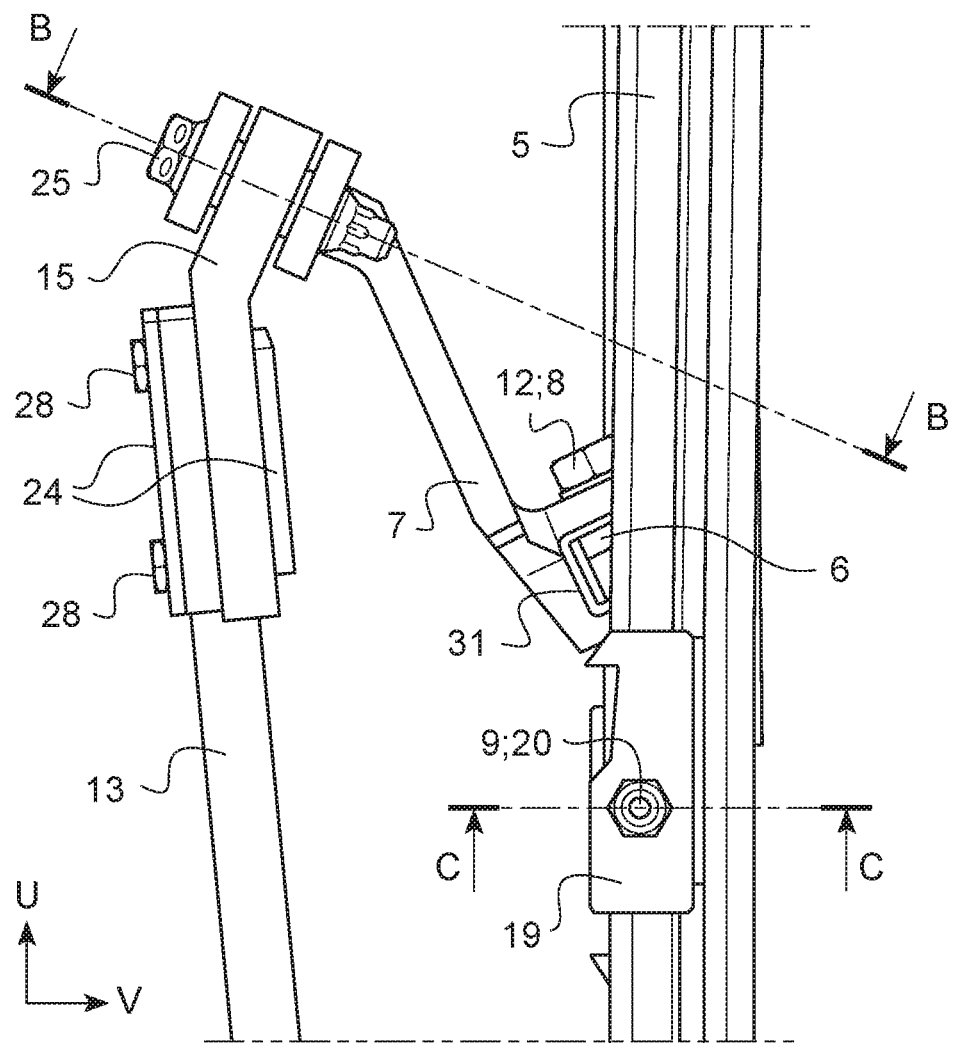
FIG. 4 shows a lateral view of the part of the twin blade windshield wiper system according to FIG. 3.

According to FIG. 3, 4 corresponding features are referred to with references of FIGS. 1 and 2. Two wiper blades 5 of the wiper system 3 are pivotally attached to a rocker 6 with a distance a between each other. Said two wiper blades 5 are oriented essentially parallel relative to each other on the windshield 1. The rocker 6 is pivotally attached to a prolongation fitting 7 by means of a rocker fit bolt 12. The prolongation fitting 7 is pivotally attached to the two cranked fittings 15. The prolongation fitting 7 is provided with a central opening 26 to reduce weight.

Each one of said two wiper blades 5 is pivotally attached to the rocker 6 by means of a wiper blade shaft 20. A wiper blade holder 19, which holds the wiper blade 5, can rotate about the wiper blade shaft 20. The center line of the wiper blade shaft 20 defines a wiper blade rotation axis 9, where each one of said wiper blades 5 can rotate independently about the wiper blade rotation axis 9 for maintaining the wiper blades 5 along their longitudinal extension to the windshield 1.

Figure 5:
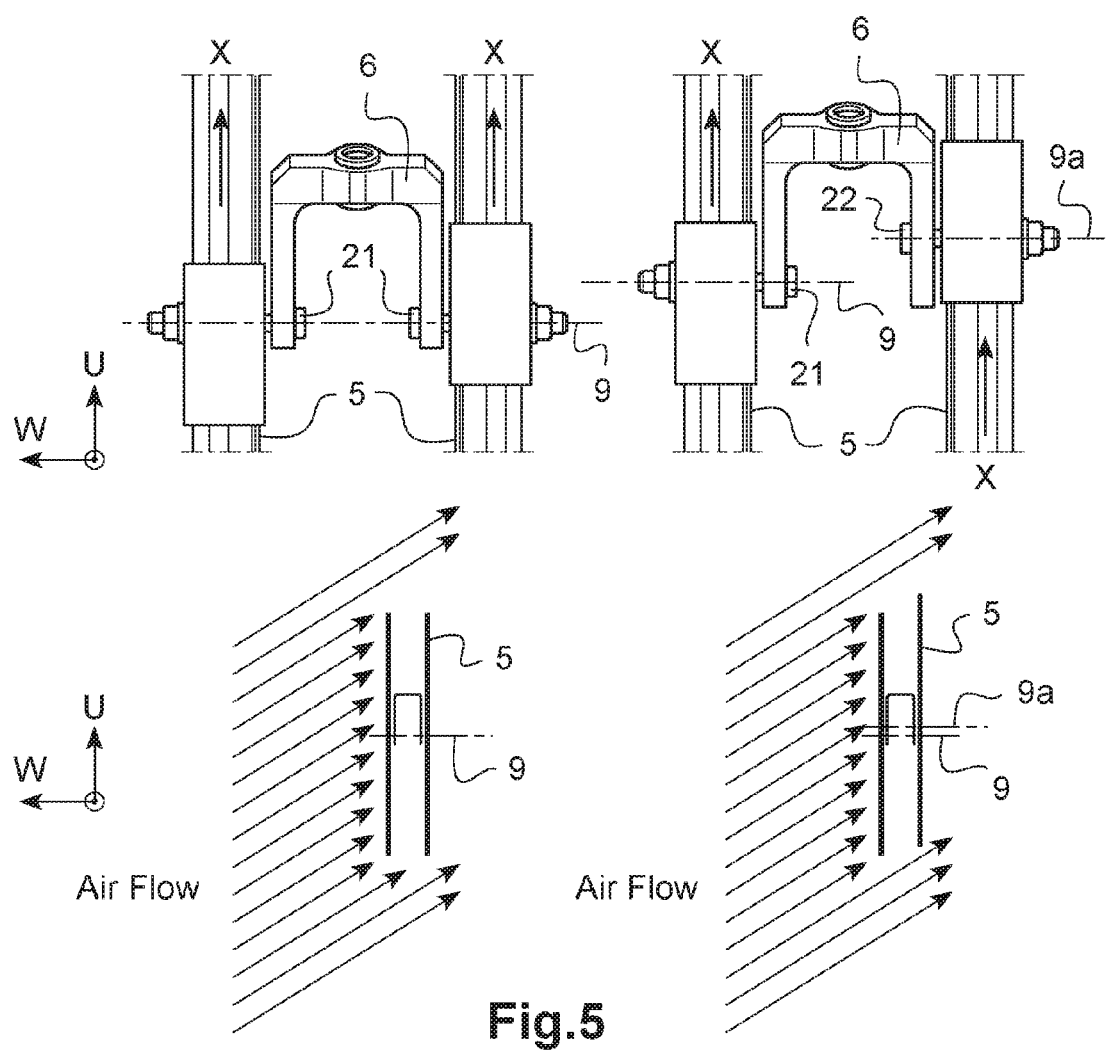
FIG. 5 shows two top views of a part of the twin blade windshield wiper system according to the invention with different possible formations of wiper blades on the rocker for achieving an optimal aerodynamic flow on the wiper blades.

According to FIG. 5 corresponding features are referred to with references of FIGS. 1 to 4. Two alternative positions of wiper blade shaft attachments 21 and 22 to the rocker 6 are provided for the wiper system 3. In the 1$^{st}$ alternative of the two positions of the wiper system 3, the wiper blades 5 are arranged without an offset in longitudinal blade direction x relative to each other, i.e. the left and right wiper blade shafts 20 are positioned to be on a common wiper blade rotation axis 9. In the 2$^{nd}$ alternative position the wiper blades 5 are arranged on two different wiper blade rotation axes 9 and 9a with an offset in longitudinal blade direction x relative to each other to achieve better aerodynamic flow on the wiper blades 5 during operation of the wiper system 3. The aerodynamic flow on the left side and on the right side of the rotary wing aircraft windshield 1 is different due to the combination of the flow due to the rotary wing aircraft forward speed and the flow due to the main rotor.

According to FIGS. 6 and 7 corresponding features are referred to with the references of FIGS. 1 to 5. The rocker 6 is pivotally mounted on the prolongation fitting 7 by means of the bearing bushes 10 and the rocker fit bolt 12 which defines a rocker rotation axis 8. The bearing bushes 10, which are integrated in the rocker 6, are rotatable about the rocker fit bolt 12 and the rocker rotation axis 8.

The plane y'-z' is defined by a perpendicular orientation relative to the longitudinal extension of the wiper blades 5 and is located in the wiper blade rotation axis 9, here the wiper blade rotation axis 9 has the closest distance to the windshield surface 1. A plane x'-z' is defined by the perpendicular orientation to the plane y'-z', where the lane wiper blade rotation axis 9 is parallel to the said plane x'-z'. A plane x'-y' is defined by perpendicular orientation to the planes y'-z' and x'-z'. The rocker rotation axis 8 is located in the plane x'-y' in the middle position between the wiper blades 5. The rocker rotation axis 8 is inclined with an angle δ relative to the plane x'-z'. The points P1 and P2 are the contact points between the respectively left and right wiper blade lips 11 and the windshield surface 1 in the plane y'-z'. A plane y"-z" is defined by the perpendicular orientation to the rocker rotation axis 8 through the points P1 and P2. The point P0 is the intersection point of rocker rotation axis 8 through the plane y"-z".

The lines L1 and L2 respectively defined by the tangential orientation to the windshield surface 1 through the contact points P1 and P2 and are located in the plane y"-z". The distances between the lines L1 and L2 and the intersection point P0 are defined as distances bi. For simplification of wiper system design the distance b can be described as the arithmetic average distance:

$$b = \frac{\sum_{i=1}^{n=2} b_i}{n},$$

where the distance b is defined as the distance between the intersection of the lines L1 and L2 and the intersection point P0. If the curvature gradient of windshield 1 between the two wiper blades 5 across the wiper operating area 4 is small and can be neglect, the distance b can be described as the distance between point P0 and the line connecting the points P1 and P2.

The angle β is to be selected between $0° \leq \beta < 45°$ or $135° < \beta \leq 180°$. The rotation of the rocker 6 about the rocker rotation axis 8 provides the orientation of the wiper blade shaft 20 in the plane y"-z" tangential to the windshield 1 along the wiper system 3 operating in the transversal direction (W). Therefore the axis of each wiper blade is oriented nearly perpendicular to the windshield surface 1.

The distance between the wiper blades 5 is a. The inclination β of the rocker rotation axis 8 provides a stable kinematic operating behavior of the wiper system 3, if the stability criterion $$\left[\frac{2b}{a}\right] < [1-\mu]$$

is fulfilled.

A soft filler cap is mounted in a space 31 between the rocker 6 and the prolongation fitting 7. The soft filler cap has a stopper function for the rotation of the rocker 6 about the rocker rotation axis 8 and/or a damping function for an improved dynamic behavior of the wiper system 3.

Figure 8:
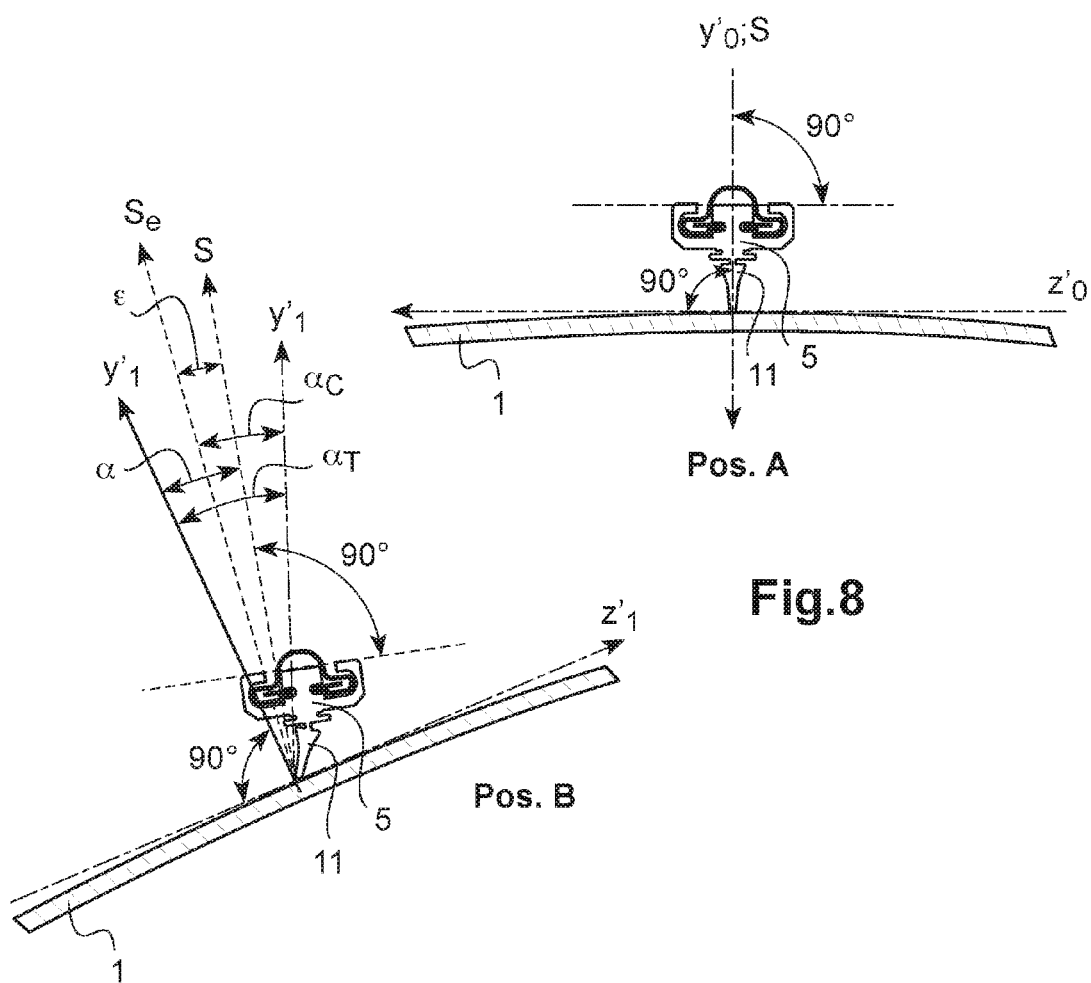
FIG. 8 shows a schematic cross sectional view of a wiper blade relative to a curved windshield on two different positions of the blade on the windshield with angle definitions.

According to FIG. 8 corresponding features are referred to with references of FIGS. 1 to 7. The cleaning performance of wiper blades 5 depends on a lean angle α between a wiper blade axis (s), which is perpendicular to the longitudinal extension of the wiper blade 5 through the contact point of the wiper blade lip 11 with the surface of the windshield 1, and a perpendicular line $y_i'$ to the windshield surface.

The increment i describes the different positions of the wiper blade 5 on the windshield 1. If the wiper blade 5 is relative to a curved windshield 1, in a central park position (pos. A in FIG. 1) i=0 and if the wiper blade 5 is in the left end position (pos. B in FIG. 1) of the same wiper blade 5 on the windshield, i=1. It is supposed that the lean angle α of the wiper blade 5 in the central park position i=0 is equal to zero degree (initial condition). The lean angle α of the wiper blade 5 in all other positions on the windshield 1 can be defined as: $\alpha = \alpha_T - (\alpha_C \pm \epsilon)$. The angle $\alpha_T$ is the target lean angle, which describes the necessary rotation angle of the wiper blade axis s perpendicular to the windshield surface. Therefore the angle $\alpha_T$ of the wiper blade in the left end position i=1 is defined to be between the perpendicular line to the windshield in the wiper blade 5 park position $y_0'$ and the perpendicular line to the windshield in the wiper blade 5 left end position $y_1'$.

The angle $\alpha_C$ is the wiper system configuration lean angle, which describes the rotation angle of the wiper blade axis s about the wiper blade longitudinal extension given for example by the control parts and/or piloting actuators of wiper system of the prior art. Therefore the angle $\alpha_C$ of the wiper blade 5 in the left end position i=1 is defined to be between the perpendicular line to the windshield in the wiper blade 5 park position $y_0'$ and the wiper blade axis $s_e$, which will be expected due to the design of a wiper system.

The angle $\epsilon$ is the error tolerance lean angle, which comes for example from the low stiffness of the wiper system components or from other technical/physical aspects. Therefore the angle $\epsilon$ of the wiper blade 5 in the left end position i=1 is defined to be between the expected wiper blade axis $s_e$ and the real wiper blade axis s position.

Figure 9:
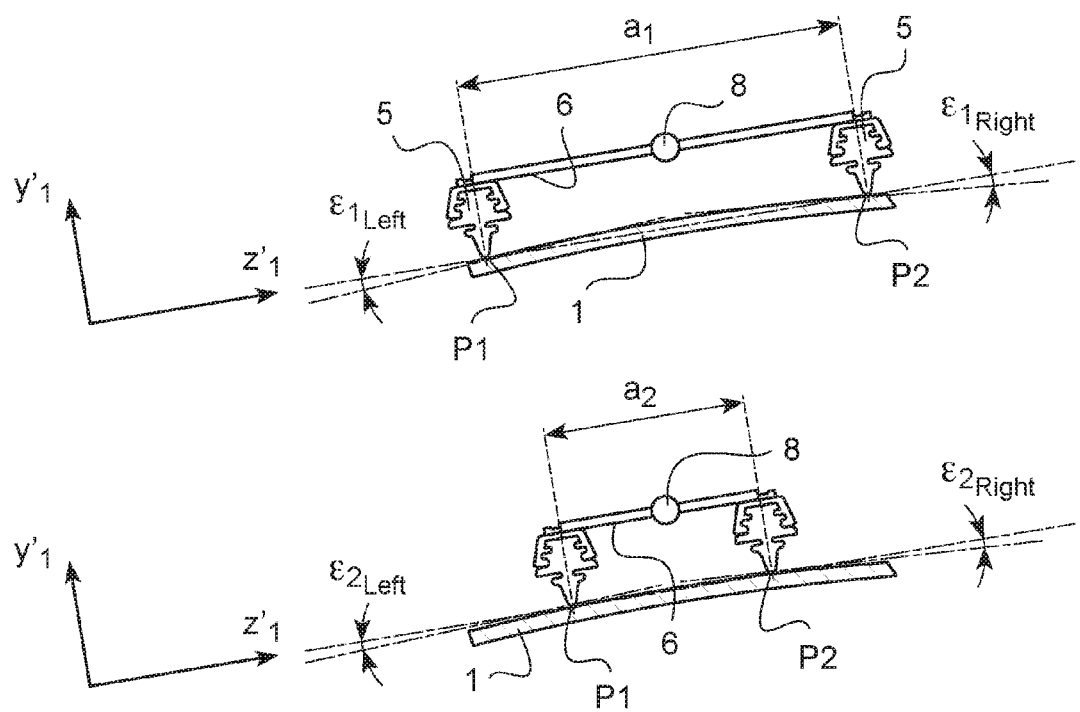
FIG. 9 shows two schematic cross sectional views of a part of a twin blade wiper system with the influence of a length (a) on the wiper blade error tolerance lean angle ε.

According to FIG. 9 corresponding features are referred to with references of FIGS. 1 to 8. The inventive twin blade windshield wiper system 3 allows—across the entire range of oscillation of the wiper blades 5—the orientation of the wiper blades perpendicular to the windshield without use of additional actuators and/or control arms or other control mechanical parts. The orientation of the inventive twin blade windshield wiper system 3 is continuously calibrated fully automatically by the windshield itself and the forces exerted on the wiper blades 5/rocker 6, where the wiper blade shafts 20 will be oriented parallel to the line connecting left and right wiper blade lips 11 by means of rotation of the rocker 6 about the rocker rotation axis 8. Therefore the wiper system 3 has an inherent configuration lean angle $\alpha_C$, which is always equal to the target lean angle $\alpha_T$.

With two different distances (a) between two wiper blades 5 it is visible that reducing length (a) reduces the error tolerance angles $\epsilon$ and therefore reduces the lean angle $\alpha$ with as consequence of a better cleaning performance of the wiper blade 5. Due to the reduced length (a) and the requirement induced by the kinematic stability criterion $$\left[\frac{2b}{a}\right] < [1-\mu],$$

it is necessary to reduce the distance (b), which is depending on the inclination angle $\beta$. Therefore with the selection of the distance a and the angle $\beta$ the kinematic behavior of wiper system 3 is stable while ensuring a better cleaning performance of the wiper blade 5.

The target lean angle $\alpha_T$ and therefore the configuration lean angle $\alpha_C$, which is to be found in local system y'-z', may not achieve or exceed 90°. Otherwise the wiper system 3 will be blocked by the windshield 1 self. Therefore the physical possible range of the configuration lean angle $\alpha_C$ due to the twin blade wiper system 3 is defined to be $0° \le \alpha_C < 90°$.

The target lean angle $\alpha_T$ along the longitudinal extension of wiper blade 5 is different to the target lean angle which is required to be in the plane y'-z, due to the possibility of different windshield curvatures along the wiper blade 5 from upper to lower blade edge (twist grade of windshield surface). Therefore the lean angle $\alpha$ along the wiper blades 5 longitudinal extension will be always different by the installation of any wiper system 3 on the curved windshield 1 within twisted surface degree due to an additional twist grade error tolerance angle $\epsilon_T$. Therefore the twin blade wiper system 3 can be installed on all strong curved windshields 1 without the significant wiper cleaning performance reduction as far as the twist grade error tolerance angle $\epsilon_T$ along the longitudinal extension of the wiper blade 5 does not exceed 20°.

Figure 10:
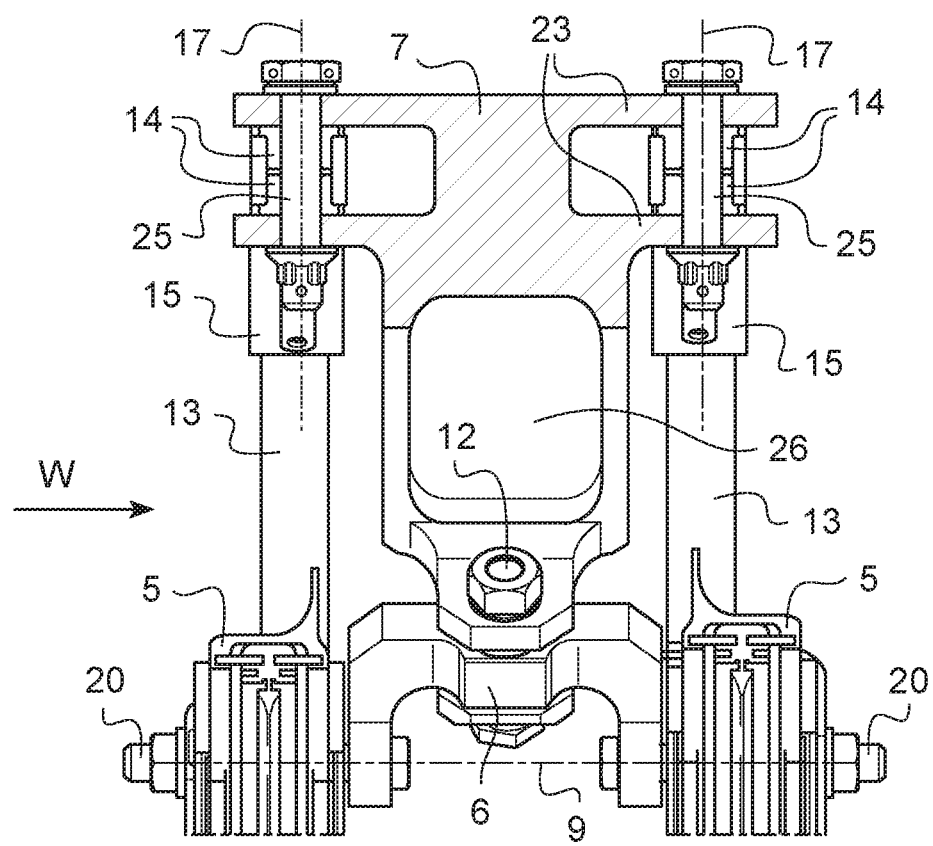
FIG. 10 is a cross sectional view along the line B-B of FIG. 4.
Figure 11:
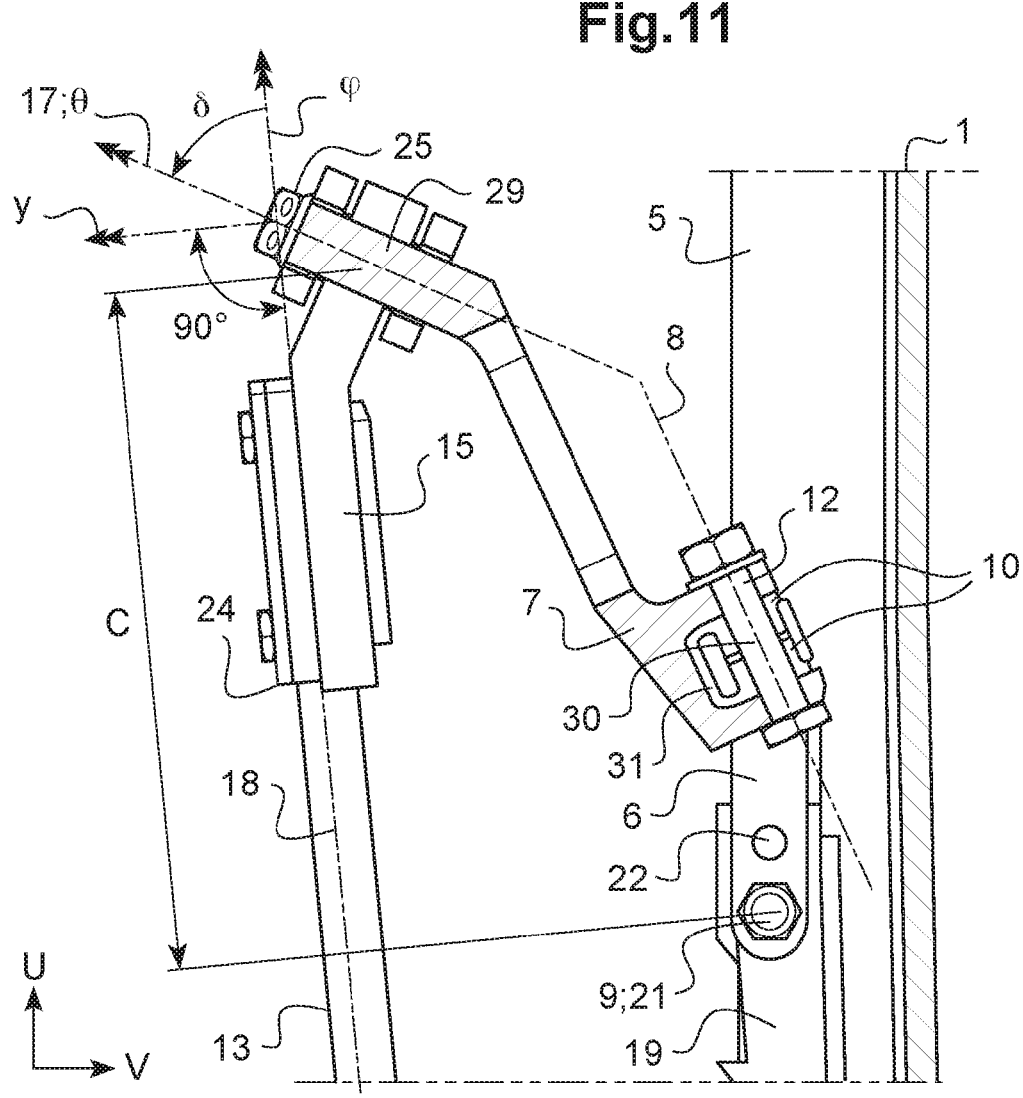
FIG. 11 shows a cross sectional view along the line A-A of FIG. 3 with an example of a prolongation fitting rotation relative to a curved windshield due to an inclination of a prolongation fitting rotation axes.

According to FIG. 10 and FIG. 11 corresponding features are referred to with the references of FIGS. 1 to 9. The prolongation fitting 7 is pivotally mounted on the cranked fittings 15 between the bearing bushes 14 and fit bolts 25. The bearing bushes 14, which are integrated in the cranked fittings 15, can rotate around the fit bolts 25, where the center line of the fit bolts 25 defines the prolongation fitting rotation axes 17. The prolongation fitting rotation axes 17 are parallel to each other and are aligned to provide the pantograph function of the wiper system 3 with at least two drivingly connected wiper arms 13.

According to a preferred embodiment of the invention the prolongation fitting rotation axes 17 can be inclined in the design plane U-V with respect to a longitudinal extension axis 18 of the at least one wiper arm 13 at an angle $\delta$. The range of this angle $\delta$ can be selected in between $45° < \delta < 135°$. Due to the oscillation of the at least one wiper arm 13 by the gear drive 2 with an angle $\gamma$ the prolongation fitting cross beam 23 will rotate about an axis perpendicular to the axis 18 at the same angle $\gamma$. This is the known pantograph function of the wiper system 3 with at least two drivingly connected wiper arms 13.

Due to the inclination of the prolongation fitting rotation axes 17 by the angle $\delta$ additional rotation of the prolongation fitting cross beam 23 about the longitudinal extension of the at least one wiper arm 13 will be initiated. The additional rotation of the prolongation fitting cross beam 23 about the longitudinal extension axis 18 of the at least one wiper arm 13 is given by an angle $\phi$, where the angle $\phi$ is defined by $\phi = \gamma \tan(90° - \delta)$. The total rotation of the prolongation fitting cross beam 23 relative to the longitudinal extension of the at least one wiper arm 13 about the prolongation fitting rotation axes 17 is given by an angle $\theta$ defined by $$\theta = \frac{\gamma}{\cos(90° - \delta)}.$$

Therefore the angle $\delta = 90°$ causes no additional rotation of the prolongation fitting cross beam 23 about the longitudinal extension axis 18 of the at least one wiper arm 13 and the prolongation fitting cross beam 23 is always parallel to the orientation of the cross beam 23 in park position (A). Due to the selected range $45° < \delta < 90°$ the prolongation fitting cross beam 23 will be oriented in tangential direction to the windshield 1 within concave curvature by an angle $\phi$. Due to the selected range $90° < \delta < 135°$ the prolongation fitting cross beam 23 will be oriented in nearly tangential direction relative to the windshield 1 within convex curvature by an angle $\phi$.

Figure 12:
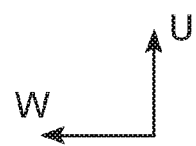
FIG. 12 shows options for different wipe areas of the twin blade windshield wiper system according to the invention.

According to FIG. 12 corresponding features are referred to with the references of FIGS. 1 to 11. A width (w) of the wiper operating area 4 depends on the wiper arm length (d) and is defined as the distance between the center of the bore hole on the cranked fitting 29 left and right end positions (B) and (C). Therefore by the selection of the length (d) the width (w) of the wiper operating area 4 can be easily adapted to different windshields with different required wiper operating areas without changes of the gear drive and therefore without changes of the wiper system operating angle $\gamma$.

A distance c is defined to be in between a projected point of the center of a bore hole 29 on the cranked fitting 15 and the projected wiper blade axis 9 to a plane defined by the axes 18 of two wiper arms 13. Therefore the design length of prolongation and rocker fitting determines the distance c. Due to the magnitude of this distance c the wiper operating area 4 can be displaced along the axis U away or toward to gear drive 2.

The wiper operating range 4 of the twin blade wiper system 3 can be adjusted to the different curved and non-curved windshields 1 with different required wiper areas 4 by the selection of the parameters (a), (c), (d), (β) and (δ) without changes of the oscillating gear drive angle γ. Whereas the distance (a) is responsible for the cleaning performance of the wiper blades 5, the distance (d) is responsible for the width regulation (w) of the wiper operating area 4, the distance (c) is responsible for the displacement of the wiper operating area 4 towards or away from gear drive 2, the angle β is responsible for the stable kinematic behavior of the wiper system 3 and the combination of the angle β and the angle δ is responsible for the covering of the wiper operating area 4.

Figure 12A:
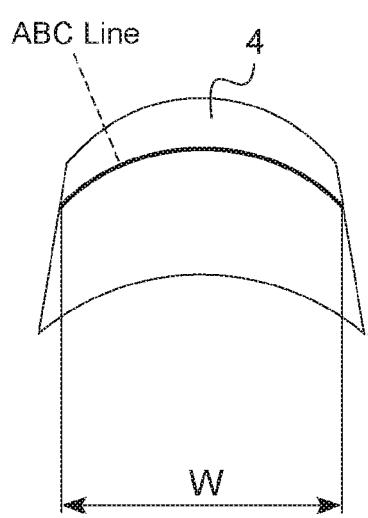
Figure 12B:
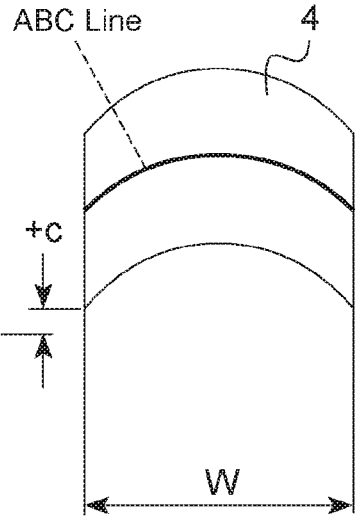
Figure 12C:
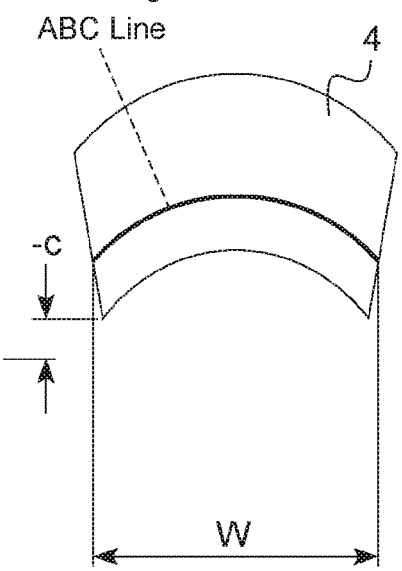

We show as examples three different forms of the wiper operating area 4: resp. straight (FIG. 12b), conic 1 (FIG. 12a) and conic 2 (FIG. 12c). The straight form of the wiper operating area 4 (FIG. 12b) is obtained if the angle β=0° or β=180°. The conic 1 form (FIG. 12a) of the wiper operating area 4 for the convex windshield 1 is obtained if the angle β is selected in the range 0°<β<45° and the angle δ has a magnitude such that $\phi < \alpha_T$. The conic 2 (FIG. 12c) form of the wiper operating area 4 for the convex windshield 1 is obtained if the angle β is selected in the range 180°<β<135° and the angle δ has a magnitude such as $\phi < \alpha_T$. The conic 1 form according to FIG. 12a or conic 2 form according to FIG. 12c of the wiper operating area 4 for the selected inclination angle β is the result at the rocker 6 rotation about rocker rotation axis 8 relative to the prolongation fitting 7. If the angle δ is selected such that $\phi = \alpha_T$ the rocker 6 has no rotation about the rocker rotation axis 8 with regard to the prolongation fitting 7 and the form of the wiper operating area 4 is always straight.

An outer surrounding of the wiper operating area 4 exceeds a width (w) towards a section below an ABC reference curve on the curved windshield 1 for an angle β between 0°<β<45° and $\phi < \alpha_T$. By increasing the distance c (shown in FIG. 11) relative to the center of the bore hole 29 the wiper operating area 4 is displaced towards the gear drive 2 (FIG. 12a).

An outer surrounding of the wiper operating area 4 for an angle β=0° or β=180° provides for corresponding widths (w) along the surface of the curved windshield 1 with equal sections on both sides of the ABC reference curve. The wiper operating area is not displaced with c=0 mm (FIG. 12b).

An outer surrounding of the wiper operating area 4 exceeds a width (w) towards a section above an ABC reference curve on the curved windshield 1 for an angle β between 180°<β<135° and $\phi < \alpha_T$. By reducing the distance c (described in FIG. 11) relative to the center of the bore hole 29 the wiper operating area 4 is shifted away from the gear drive 2 (FIG. 12c).

REFERENCE LIST

1 Windshield
2 Gear Drive
3 Wiper System
4 Wiper Operating Area
5 Wiper Blade(s)
6 Rocker
7 Prolongation Fitting
8 Rocker Rotation Axis
9 Wiper Blade Rotation Axis
10 Bearing Bushes on the Rocker
11 Wiper Blade Lip
12 Fit Bolt (Prolongation Fitting to Rocker)
13 Wiper Arm(s)
14 Bearing Bushes on the Cranked Fitting
15 Cranked Fitting
16 Tension Spring
17 Prolongation Fitting Rotation Axis
18 Wiper Arm Axis (Along the Wiper Arm longitudinal Extension)
19 Wiper Blade Holder
20 Wiper Blade Shaft (or Fit Bolt)
21 Bore Hole on the Rocker for Wiper Blade Attachment
22 Alternative Bore Hole on the Rocker for Wiper Blade Attachment
23 Cross Beam Part of Prolongation Fitting
24 Clamping Pieces
25 Fit Bolt (Prolongation Fitting to Cranked Fitting)
26 Central Opening
27 Wiper Arm Rotation Axis
28 Bolts (Cranked Fitting to Clamping Piece)
29 Centre of the Bore Hole on the Cranked Fitting
30 Centre of the Bore Hole on the Rocker
31 Space for the installation of a soft filler cap
32 Drive Brackets

What is claimed is:

1. A windshield wiper system for rotary wing aircrafts with a windshield having a curved surface and an oscillating gear drive with a central park position, the system comprising:
two wiper arms and wiper blades with lips, the wiper blades being mounted by means of the wiper arms to the oscillating gear drive for oscillation across the windshield about an oscillatory axis,
the windshield and the wiper blade lips have a frictional coefficient (μ) therebetween,
the wiper blades being mounted to the at least one wiper arm distal to oscillatory axis and defining in the central park position a longitudinal axis along the curved surface of the windshield, and the at least one wiper arm in the central park position being aligned with the longitudinal axis; wherein
the two wiper blades each with a wiper blade fit bolt, bearing bushes, a prolongation fitting and a rocker are provided, the two wiper blades being mounted rotatable about a wiper blade rotation axis, perpendicular to the oscillatory axis and the longitudinal axis, the wiper blade rotation axis, being defined by a center line through the wiper blade fit bolts mounted opposed to each other on the two wiper blades being essentially parallel with a distance (a) to each other, the rocker rotatable attaching each of the two wiper blades by means of a respective one of the wiper blade fit bolts, and the prolongation fitting rotatable attaching the rocker to the wiper arms, a rocker fit bolt defining a rocker rotation axis in a plane defined by the oscillatory axis and the longitudinal axis with an inclination angle β to the outer surface of the windshield in the central park position providing a distance (b) direct under the wiper blades rotation axis between the windshield and the rocker rotation axis perpendicular to the windshield in the central park position fulfilling $$\left[\frac{2 \cdot b}{a}\right] < (1 - \mu).$$

2. The windshield wiper system according to claim 1, wherein the prolongation fitting is rotatable around a prolongation fitting rotation axis in the plane defined by the oscillatory axis and the longitudinal axis with an inclination angle $\delta$ to the wiper arms.

3. The windshield wiper system according to claim 1, wherein the fit bolt of the rocker rotation axis is 5 to 10 cm away from the windshield.

4. The windshield wiper system according to claim 1, wherein the ends of the wiper arms are cranked.

5. The windshield wiper system according to claim 1, wherein the inclination angle $\beta$ of the rocker rotation axis is $0°<\beta<45°$ or $135°<\beta<180°$.

6. The windshield wiper system according to claim 1, wherein each one of the two wiper blades can rotate independently around the wiper blade rotation axis relative to the rocker.

7. The windshield wiper system according to claim 1, wherein the rocker has alternative bore holes to adjust the two wiper blades.

8. The windshield wiper system according to claim 1, wherein the prolongation fitting is adjustable on the two wiper arms by means of clamping pieces.

9. The windshield wiper system according to claim 1, wherein the ends of the wiper arms are cranked with an angle $\delta$ between 45° and 135°.

\* \* \* \* \*